(12) United States Patent
Ruggirello

(10) Patent No.: US 11,484,109 B2
(45) Date of Patent: Nov. 1, 2022

(54) HANDHELD CAMERA SUPPORT ASSEMBLY INCLUDING HARNESS WITH SUPPORT ASSEMBLY

(71) Applicant: Michael Frederick Ruggirello, Los Angeles, CA (US)

(72) Inventor: Michael Frederick Ruggirello, Los Angeles, CA (US)

( * ) Notice: Subject to any disclaimer, the term of this patent is extended or adjusted under 35 U.S.C. 154(b) by 0 days.

(21) Appl. No.: 17/205,564

(22) Filed: Mar. 18, 2021

(65) Prior Publication Data
US 2021/0289928 A1    Sep. 23, 2021

Related U.S. Application Data

(60) Provisional application No. 62/991,227, filed on Mar. 18, 2020.

(51) Int. Cl.
*A45F 5/00* (2006.01)
*F16M 13/04* (2006.01)

(52) U.S. Cl.
CPC ............... *A45F 5/00* (2013.01); *F16M 13/04* (2013.01); *A45F 2005/006* (2013.01); *A45F 2200/0533* (2013.01)

(58) Field of Classification Search
CPC .............. A45F 5/00; A45F 2005/006; A45F 2200/0533; F16M 13/04; F16M 11/10; Y10S 224/908; G03B 17/561; F41C 33/001
USPC ................................................ 224/259, 908
See application file for complete search history.

(56) References Cited

U.S. PATENT DOCUMENTS

| 281,338 A | * | 7/1883 | Butler | F41C 33/001 |
| | | | | 248/118.3 |
| 3,390,477 A | * | 7/1968 | Galbraith | F41C 33/001 |
| | | | | 248/118 |
| 4,991,758 A | * | 2/1991 | Eaneff | F16M 13/04 |
| | | | | 224/264 |
| 5,111,983 A | * | 5/1992 | Simmons | F16M 13/04 |
| | | | | 348/E5.025 |
| 5,220,704 A | * | 6/1993 | Flynn | B08B 3/026 |
| | | | | 15/327.5 |
| 5,697,537 A | * | 12/1997 | Bowlsby | A45F 5/021 |
| | | | | 224/678 |
| 5,735,496 A | * | 4/1998 | Dube | F41C 33/001 |
| | | | | 248/118 |

(Continued)

OTHER PUBLICATIONS

Dependable Expendables, "HipShot Camera Belt Support", https://dependableexpendables.com/products/hipshot, 2018, 5 pages.

(Continued)

*Primary Examiner* — Adam J Waggenspack
(74) *Attorney, Agent, or Firm* — Howard & Howard Attorneys PLLC

(57) ABSTRACT

A handheld camera support assembly includes a support assembly coupled to a harness, with the harness secured around the torso and shoulders of an operator during use. The support assembly includes an arm receiving pocket that is pivotally coupled to a torso panel with the arm receiving pocket configured for receiving an arm of the operator. A camera assist mount is coupled to the arm receiving pocket to provide a mounting or positioning point for a handheld camera during use by the operator.

20 Claims, 13 Drawing Sheets

(56) References Cited

U.S. PATENT DOCUMENTS

| | | | | |
|---|---|---|---|---|
| 5,787,317 | A * | 7/1998 | Robinson, Sr. | F16M 13/04 |
| | | | | 396/428 |
| 6,789,344 | B2 * | 9/2004 | Cain | F41C 33/001 |
| | | | | 224/265 |
| 7,270,643 | B2 * | 9/2007 | Pellinen | A63B 21/4001 |
| | | | | 602/5 |
| 8,025,193 | B1 * | 9/2011 | Gornall, Jr. | A45F 5/00 |
| | | | | 224/268 |
| 2015/0223590 | A1 * | 8/2015 | Arias-Tabima | A45F 5/021 |
| | | | | 224/195 |

OTHER PUBLICATIONS

Easyrig AB, "Easy Rig Webpage", https://easyrig.se/, 2018, 10 pages.
EBI, "Hip Stick Shooting Rest Webpage", https://hipstickrest.com/hip-stick#0c44c30d-1015-4efc-a66b-776c20dbd5da, 6 pages.
Proam USA, "Gimbal and Stabilizer Vest Support", https://www.proamusa.com/products/gimbal-stabilizer-vest-support, 2018, 9 pages.

\* cited by examiner

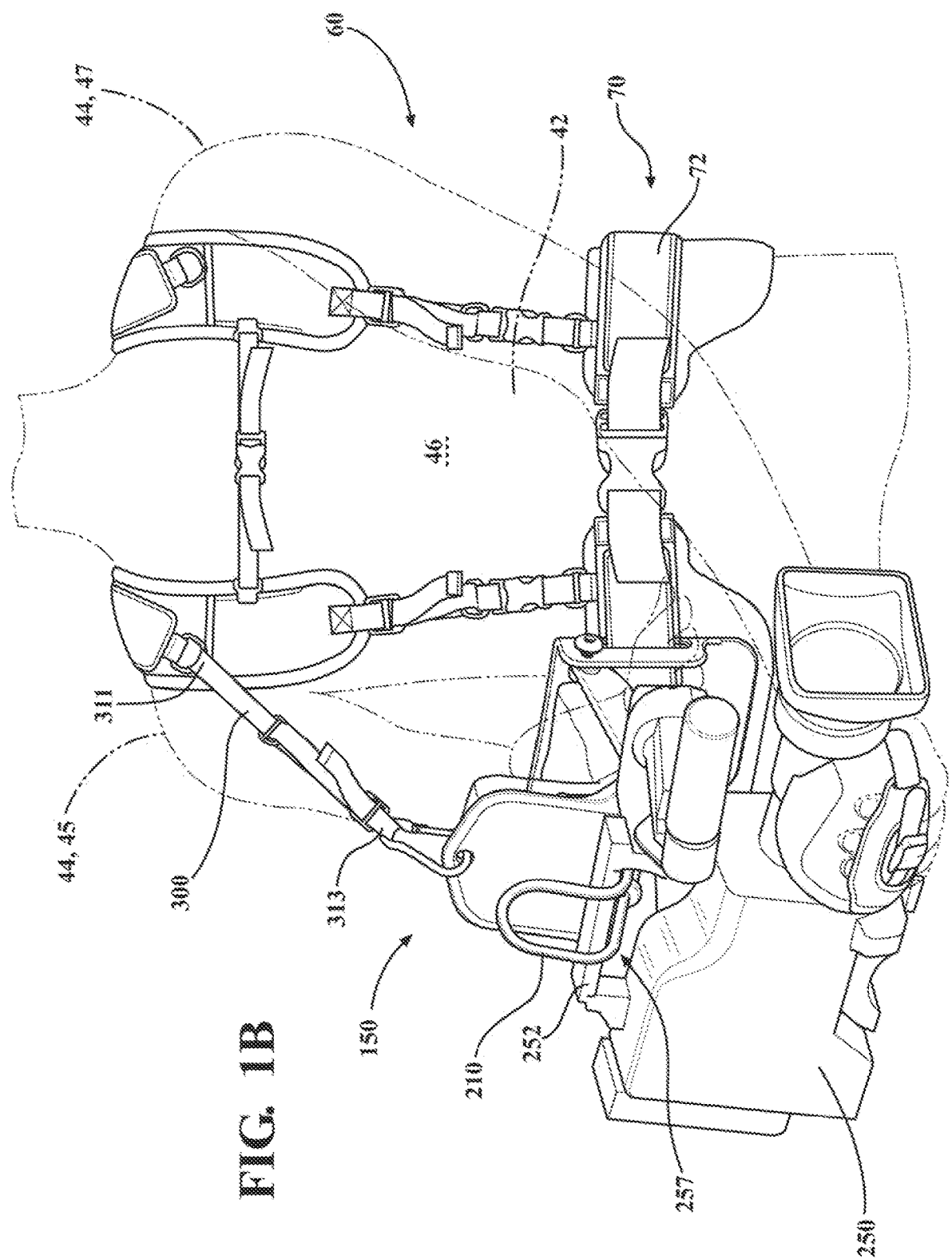

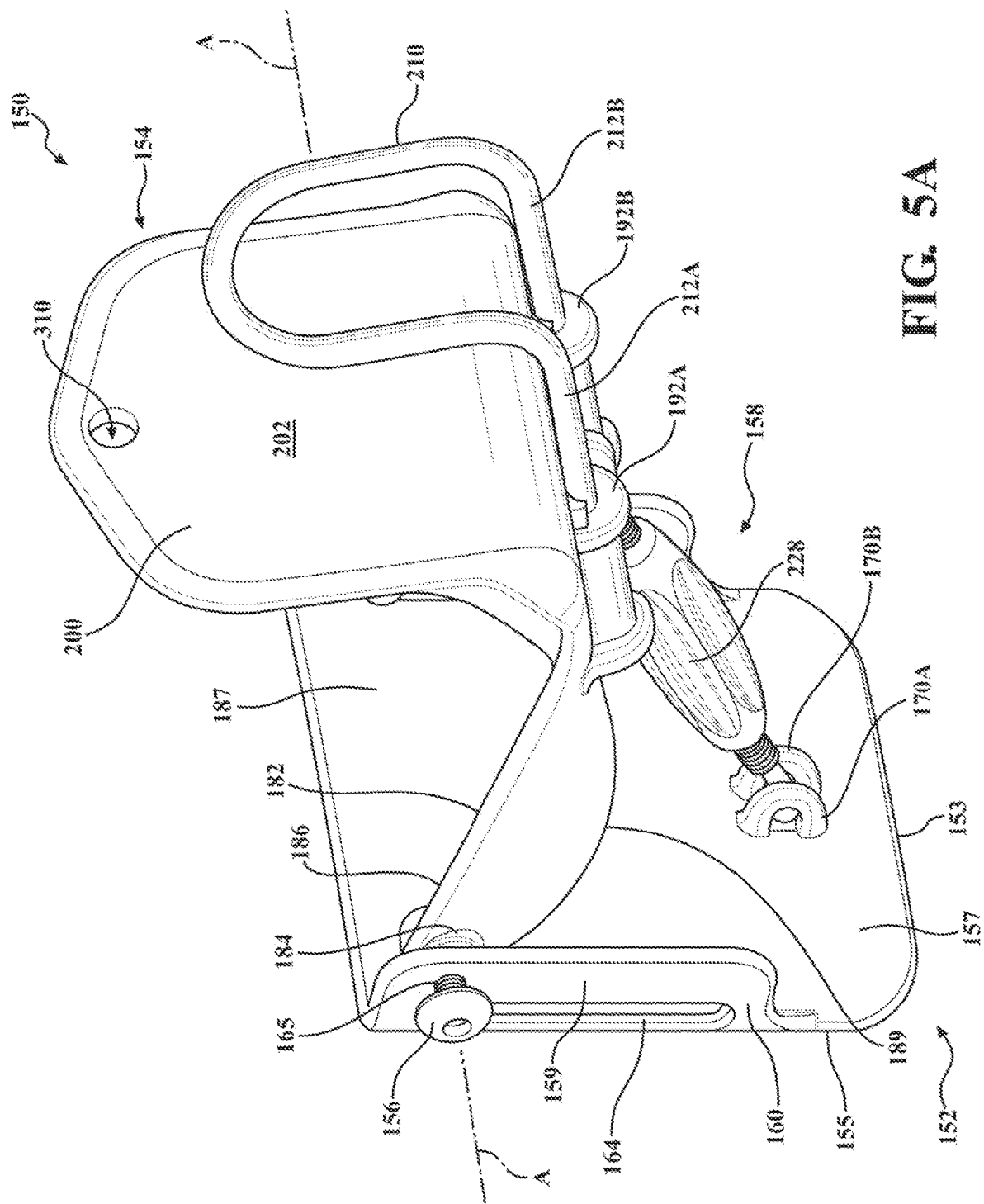

HANDHELD CAMERA SUPPORT ASSEMBLY INCLUDING HARNESS WITH SUPPORT ASSEMBLY

CROSS-REFERENCE TO RELATED APPLICATIONS

The present disclosure claims priority from U.S. Provisional App. Ser. No. 62/991,227 filed Mar. 18, 2020, the entirety of which is herein incorporated by reference.

TECHNICAL FIELD

The subject invention is directed to a harness with a support assembly, and in particular to a handheld camera support assembly including a harness with a support assembly.

BACKGROUND

Operators of handheld cameras, such as television cameras, experience fatigue during long shoots due to the weight of the camera. Further, due to the bulky nature of the camera, it is sometimes difficult for the operator to perform other tasks easily, such as get a drink of water or communicate with another person over long distances with a radio or the like. The present disclosure addresses some of the issues that operators experience.

SUMMARY

According to an exemplary embodiment, a handheld camera support assembly for use by an operator is provided that includes a harness for being secured around a torso and shoulders of the operator and a support assembly mounted to the harness. The support assembly has a torso panel, an arm receiving pocket pivotally coupled to the torso panel, and an adjust mechanism coupled to the torso panel and the arm receiving pocket to pivot the arm receiving pocket relative to the torso panel between a plurality of operating positions.

A method of utilizing the handheld camera support assembly of the exemplary embodiment is also described.

BRIEF DESCRIPTION OF THE DRAWINGS

Advantages of the present disclosure will be readily appreciated as the same becomes better understood by reference to the following detailed description when considered in connection with the accompanying drawings.

FIG. 1B is a front view of the mannequin having the handheld camera support assembly attached thereto as in FIG. 1A but with the handheld camera a handheld camera coupled onto a camera assist mount of the handheld camera support assembly with the camera assist mount in a mount assist position.

FIG. 5A is a perspective view of the support assembly of the handheld camera support assembly in accordance with one exemplary embodiment with the camera support mount in the mount assist position.

DETAILED DESCRIPTION

Figure 1A:
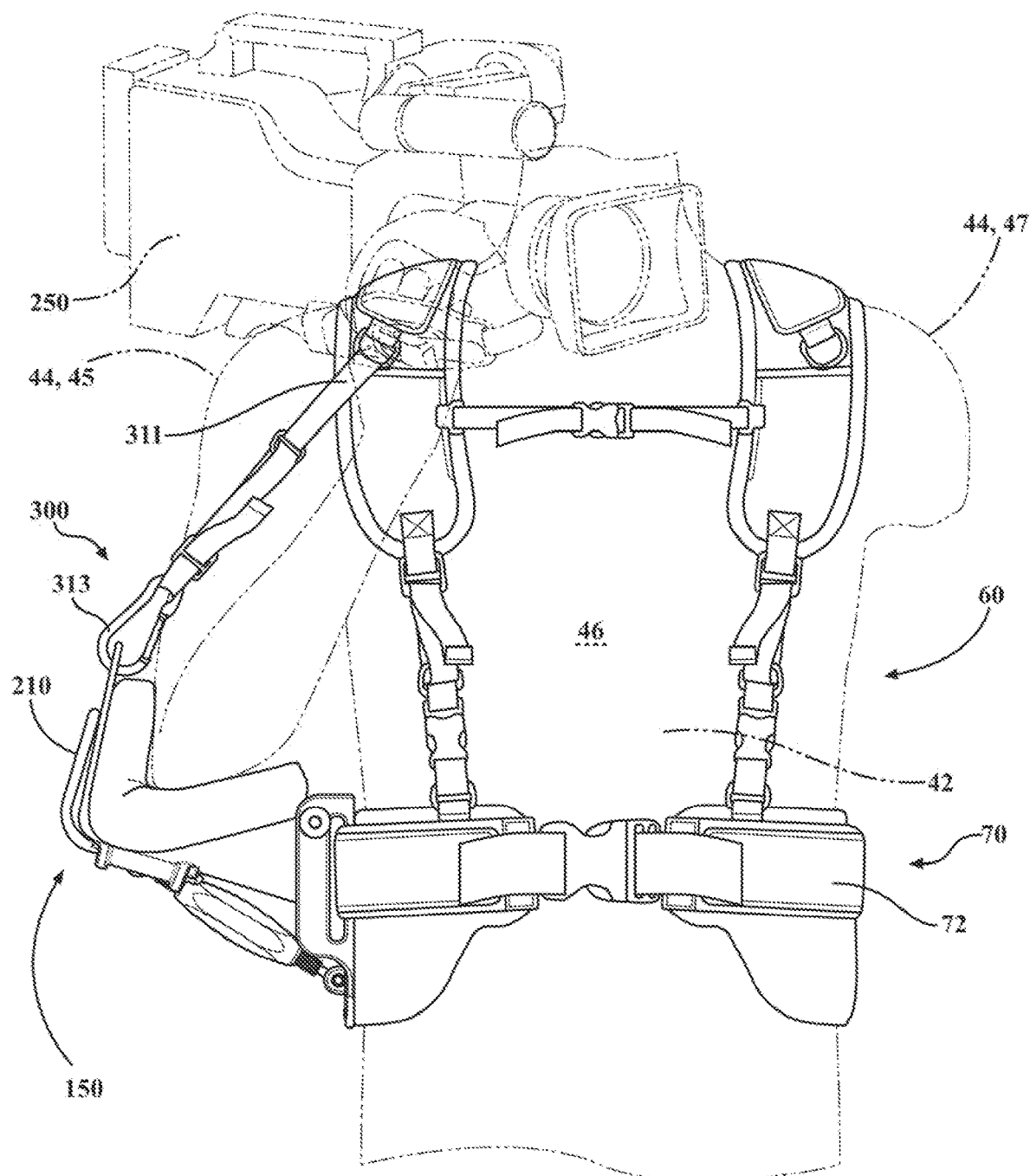
FIG. 1A is a front view of a mannequin having a handheld camera support assembly attached thereto with a handheld camera positioned on the shoulder of the mannequin and with a camera assist mount of the handheld camera support assembly in a stored position.

The subject invention is directed to a handheld camera support assembly 50 that includes a harness 60 and a support assembly 150 (sometimes alternatively referred to as an arm support assembly or elbow support assembly) that is coupled to the harness 60 during use by an operator of a handheld camera 250. In particular, during use, a handheld camera 250 is held by the operator with one of the operator's arms positioned within and supported by the support assembly 150 when the camera 250 is being operated by the operator and is placed upon the operator's shoulder (see FIG. 1A), and in certain cases wherein the camera 250 is also supported by and coupled to the support assembly 150 for use in low angle shots or when simply storing the camera 250 between uses (see FIG. 1B), as will be described further below.

For illustrative purposes, the operator in the representative Figures is represented by a mannequin 40 as provided in FIGS. 1A, 1B, 2, 3 and 5B which includes a torso 42, a shoulder region 44 having right and left shoulders 45, 47, a front side 46 corresponding to an abdomen and chest region of the operator, and a rear side 48 corresponding to the back of the operator.

Figure 2:
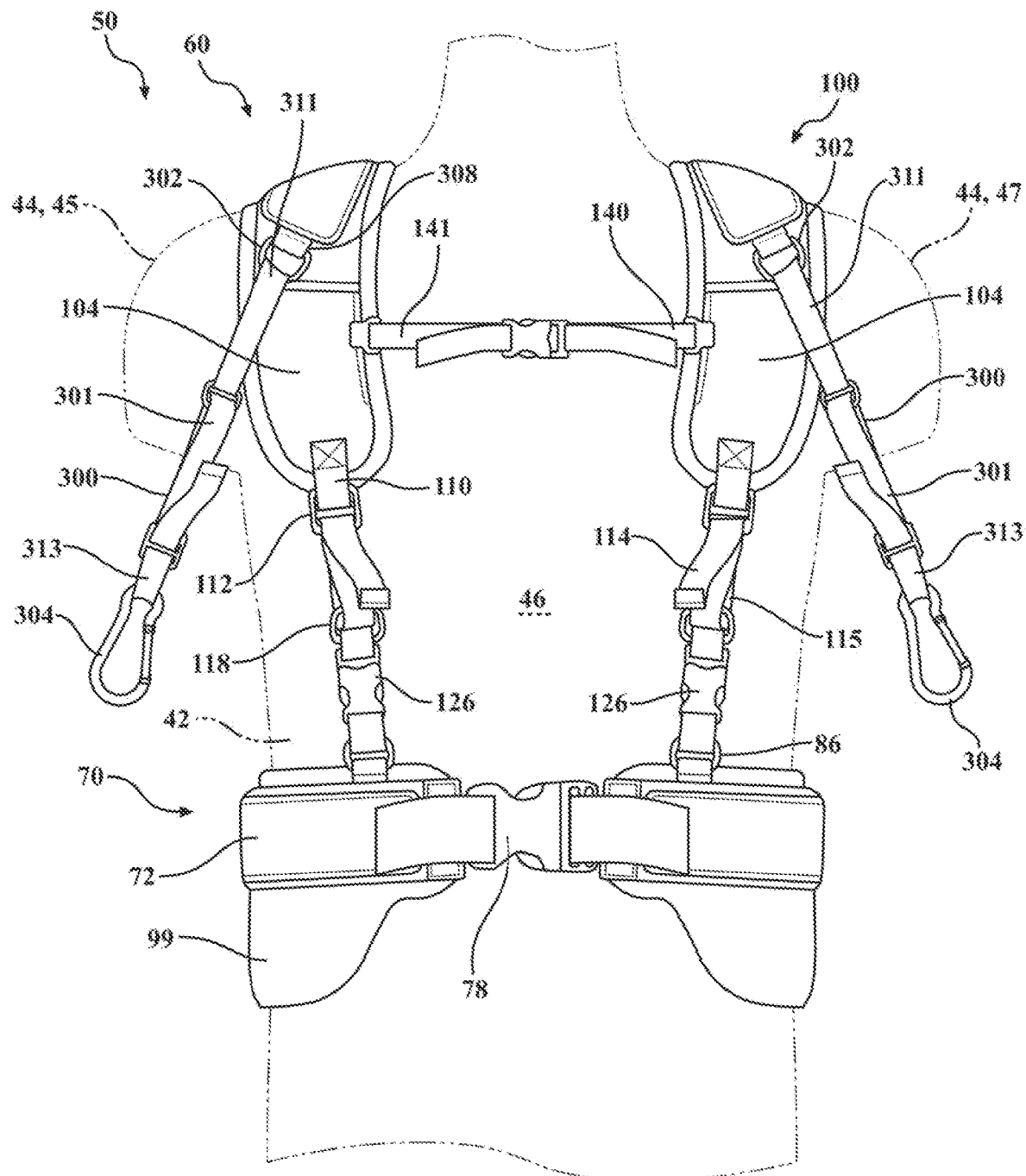
FIG. 2 is a front view of a mannequin having the harness of a handheld camera support assembly attached thereto in a fully coupled state.
Figure 3:
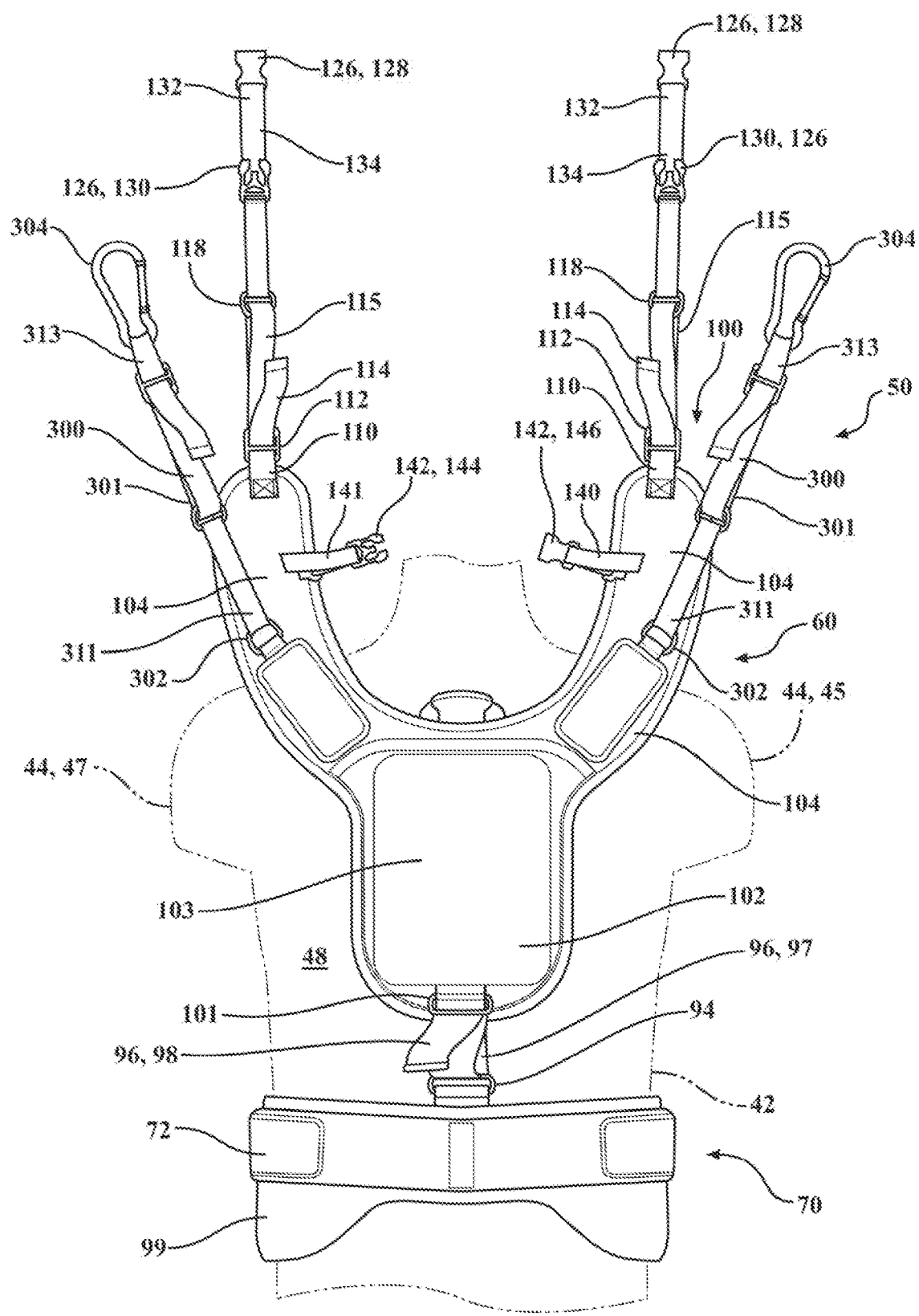
FIG. 3 is a rear view of the mannequin of FIG. 1 with the support harness attached to the mannequin in a partially coupled state.
Figure 4:
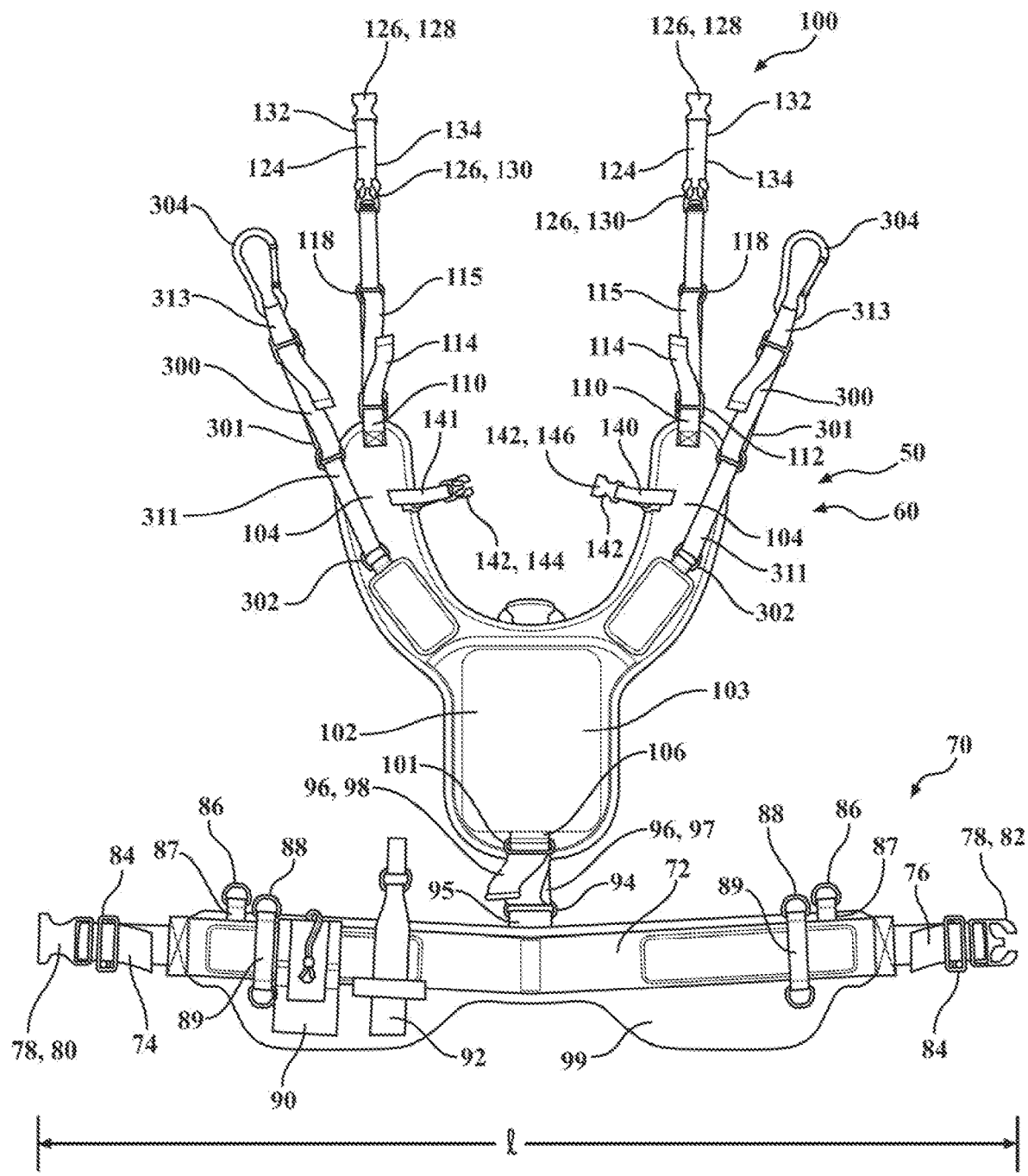
FIG. 4 is a front view of a harness of the handheld camera support assembly in accordance with one exemplary embodiment.
Figure 5B:
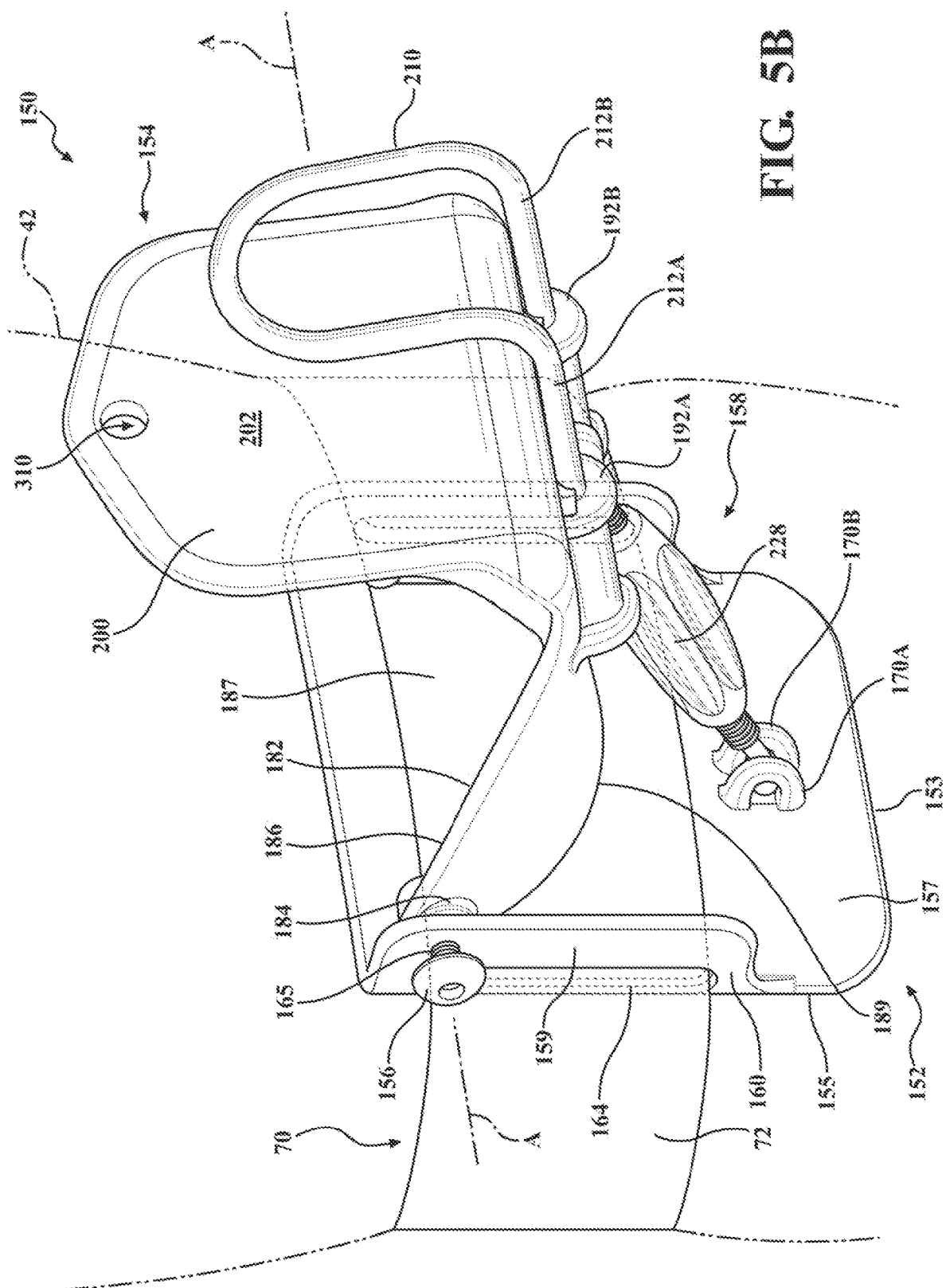
FIG. 5B is another perspective view of FIG. 5A including a portion of the support belt of the harness positioned within a slot region of pair of spaced apart flanges of a torso panel of the support assembly.
Figure 6:
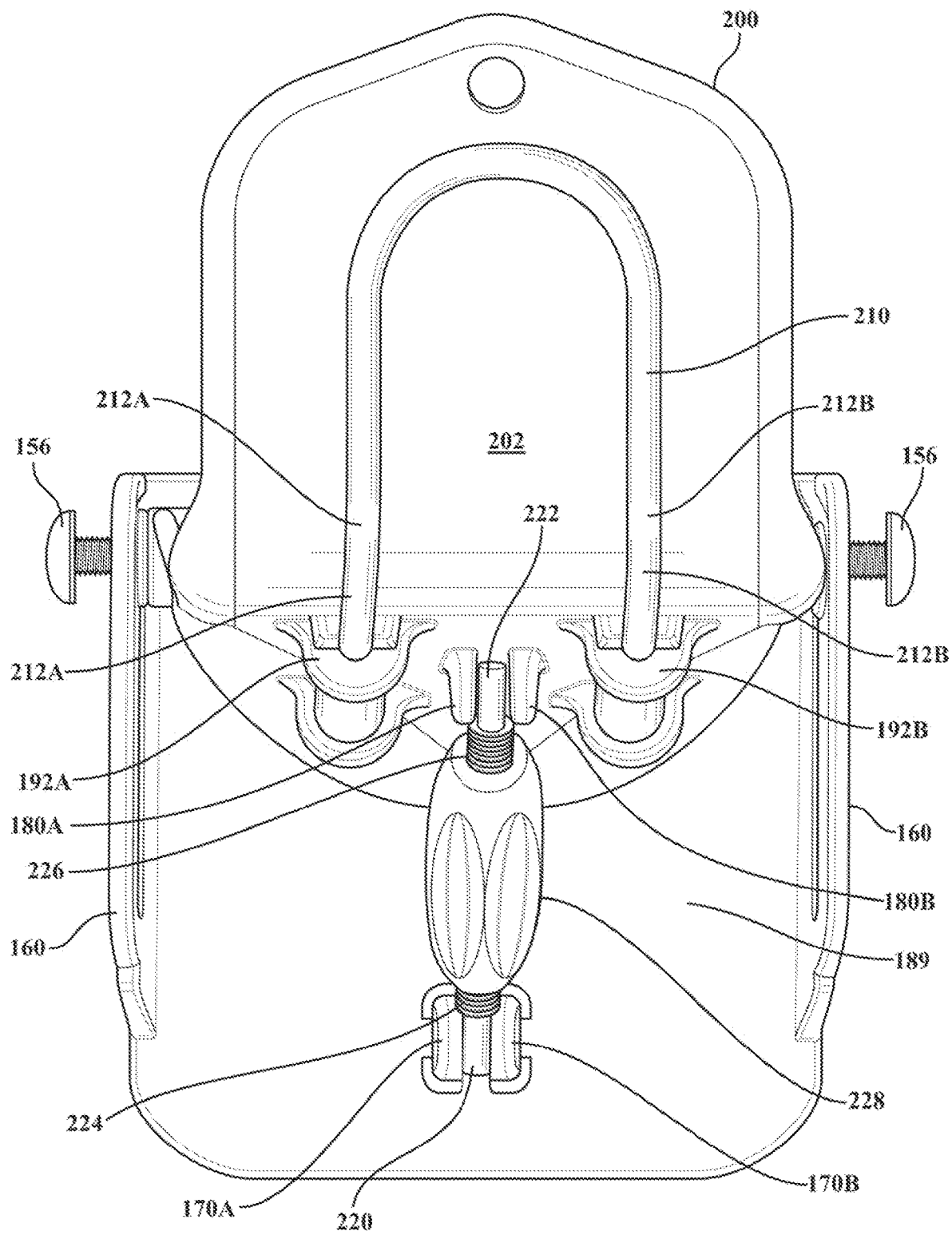
FIG. 6 is a front view of the support assembly of FIG. 5A.

As also shown in FIGS. 2-4, the harness 60 includes a support belt 70, that is secured around the mannequin 40, and as illustrated around the torso 42 of the mannequin 40. The harness 60 also includes an upper harness portion 100 coupled to the support belt 70 separately along portions of the support belt 70 along the front side 46 and rear side 48 of the mannequin, 40, with the upper harness portion 100 extending along its length over each of the right and left shoulders 45, 47. The handheld camera support assembly 50 also includes, in certain embodiments, an adjustable strap 300 coupled at one end 311 to the harness 60 and at another end 313 to the support assembly 150.

Referring now to FIGS. 2-4, the support belt 70 includes a torso belt 72 having a length l extending between a first end 74 and a second end 76, with the length l being sufficiently long to exceed the circumference of the torso 42 of the operator such that the torso belt 72 can be coupled around the torso 42 of the operator. In certain embodiments, the torso belt 72 may be formed from a flexible plastic webbing material such as the material commonly used in seat belts for automobiles or the like. In particular, the torso belt 72 may be made of flexible polymer material such as polyester woven from about 300 warp strands and one weft strand. In other embodiments, the torso belt 72 may be made of any other flexible polymeric material commonly used in harnesses and having sufficient tensile strength for its intended purpose.

The support belt 70 includes a side release buckle 78 having a female frame portion 80 coupled to the first end 74 of the torso belt 72 and a male prong portion 82 coupled to the second end 76 of the torso belt 72. The support belt 70 also includes a pair of webbing slide locks 84 coupled respectively to the first end 74 and second end 76 of the torso belt 72 that allows the length of the support belt 70 to be adjusted around the torso 42 of the operator.

The support belt 70 may also include additional components that are used secure the torso belt 72 to the upper harness portion 100. In particular, in certain embodiments, the support belt 70 includes one or more fixed rigid rings 86 inserted within a fabric portion 87, with the fabric portion 87 either secured to or integrally formed with the torso belt 72. In addition, the support belt 70 may include one or more slidable rigid rings 88 that are secured within a looped fabric portion 89, with the torso belt 72 extending through the respective openings in the looped fabric portion 89. Still further, the support belt 70 may include a centrally located fixed rigid ring 94 inserted within a fabric portion 95, with the fabric portion 95 either secured to or integrally formed with the torso belt 72. A looped strap 96 includes a looped portion 97 secured to the rigid ring 94 and a loose end portion 98 extending from the looped portion 97.

The support belt 70 may also include additional components coupled to the torso belt 72 that provided value added benefits to the operator. In certain embodiments, a looped radio pouch bag 90 and/or a looped water bottle pouch bag 92 may be included, with the torso belt 72 extending through a respective opening in the looped bags 90, 92. Still further, a support pad 99, such as a foamed fabric support pad 99, may be coupled to an inner portion of the length 1 of support belt 70.

The upper harness portion 100 incudes a central back support pad 102 and a pair of shoulder pad portions 104 extending from the central back support pad 102. Still further, the central back support pad 102 may include a centrally located slot portion 106 that accepts the loose end portion 98 of the looped strap 96 therethrough, with a webbing slide lock 101 used to secure the loose end portion 98 and thus adjustably secures the central back support pad 102 to the support belt 70, and in particular to the torso belt 72, with the length of the loose end portion 98 of the looped strap 96 configured to be adjusted to adjust the distance between central back support pad 102 and the support belt 70, and in particular to the torso belt 72, as desired by the operator.

In certain embodiments, the central back support pad 102 includes a pouch 103 which can be used to store items such as a water bottle, communication equipment such as a walkie talkie, and/or certain handheld camera equipment or the like. In certain embodiments, a hydration bladder, such as a camelback, with a reservoir and a hose (not shown) can be introduced within the pouch, with the hose accessible by the operator to provide hydration during use.

The upper harness portion 100 also includes a pair of adjustable straps 110 coupled to and extending from a respective one of the shoulder pad portions 104. Each of the adjustable straps 110 includes a first loose portion 114 fixedly coupled to respective one of the shoulder pad portions 104 and looped through a central post portion of a webbing slide lock 112 and a second looped portion 115 looped around the central post portion of the webbing slide lock 112, with the opposite end of the second looped portion 115 also looped through and secured to a ring structure 118.

An additional front mounting looped strap 124 is also separately looped through and secured to the ring structure 118. Each additional front mounting looped strap 124 includes a side release buckle 126 having a female frame portion 128 coupled to the first end 132 and a male prong portion 130 coupled to a second end 134.

The upper harness portion 100 also includes a pair of sternum straps 140, 141. A first sternum strap 140 includes a female frame portion 146 of a side release buckle 142, while the second sternum strap 141 includes a male prong portion 144 of the side release buckle.

Figure 7:
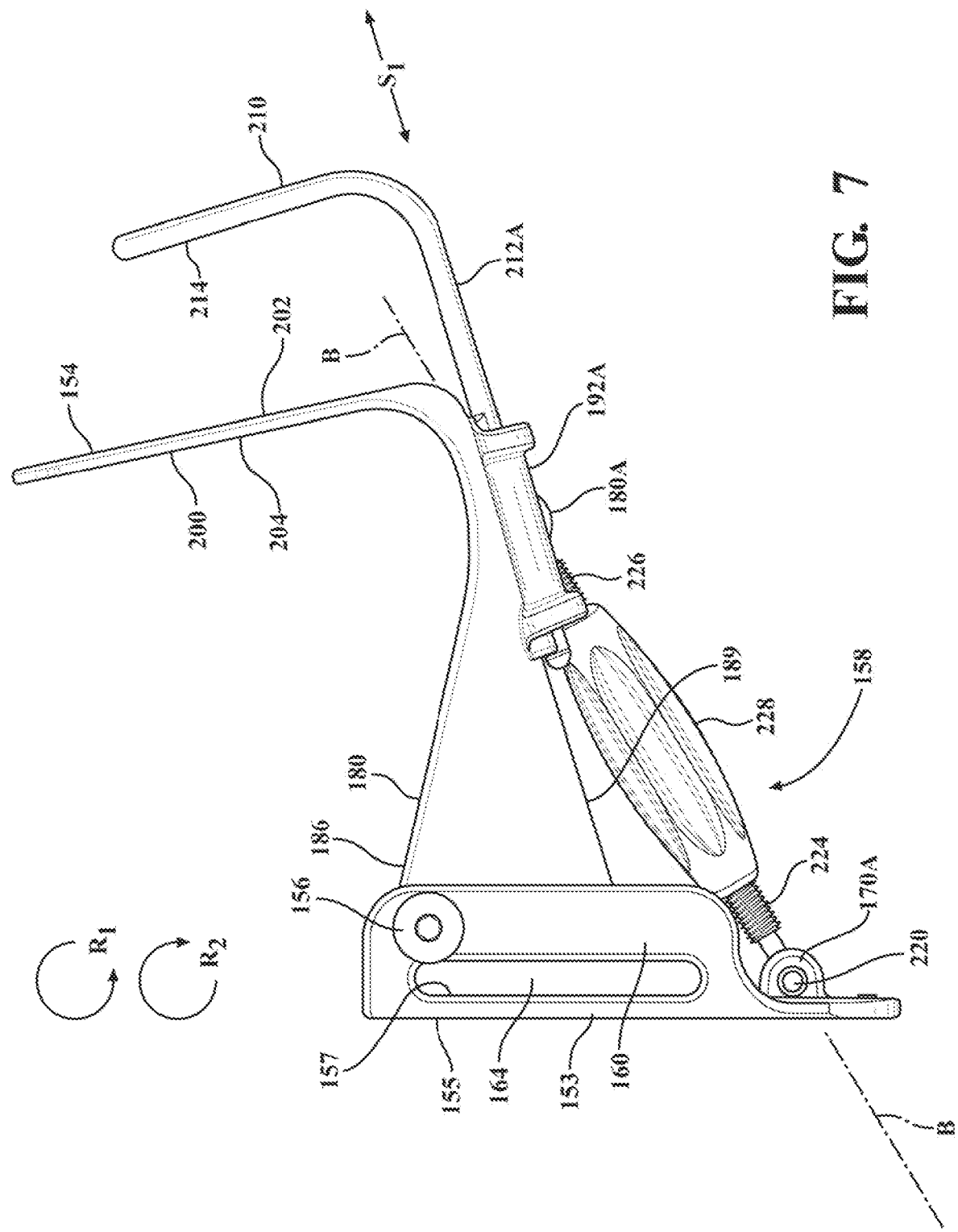
FIG. 7 is a side view of the support assembly of FIG. 6.
Figure 8:
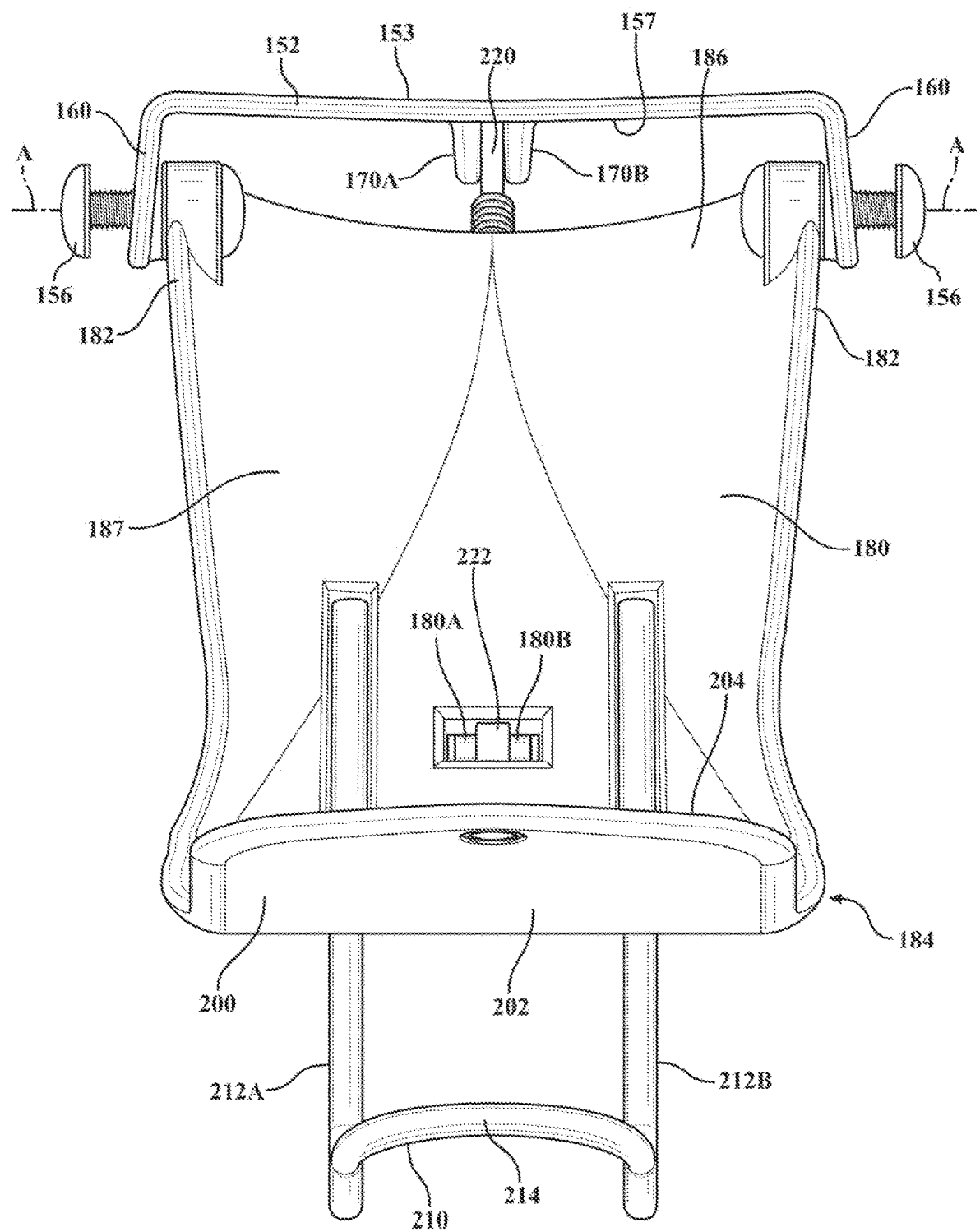
FIG. 8 is a top view of the support assembly of FIG. 6.
Figure 9:
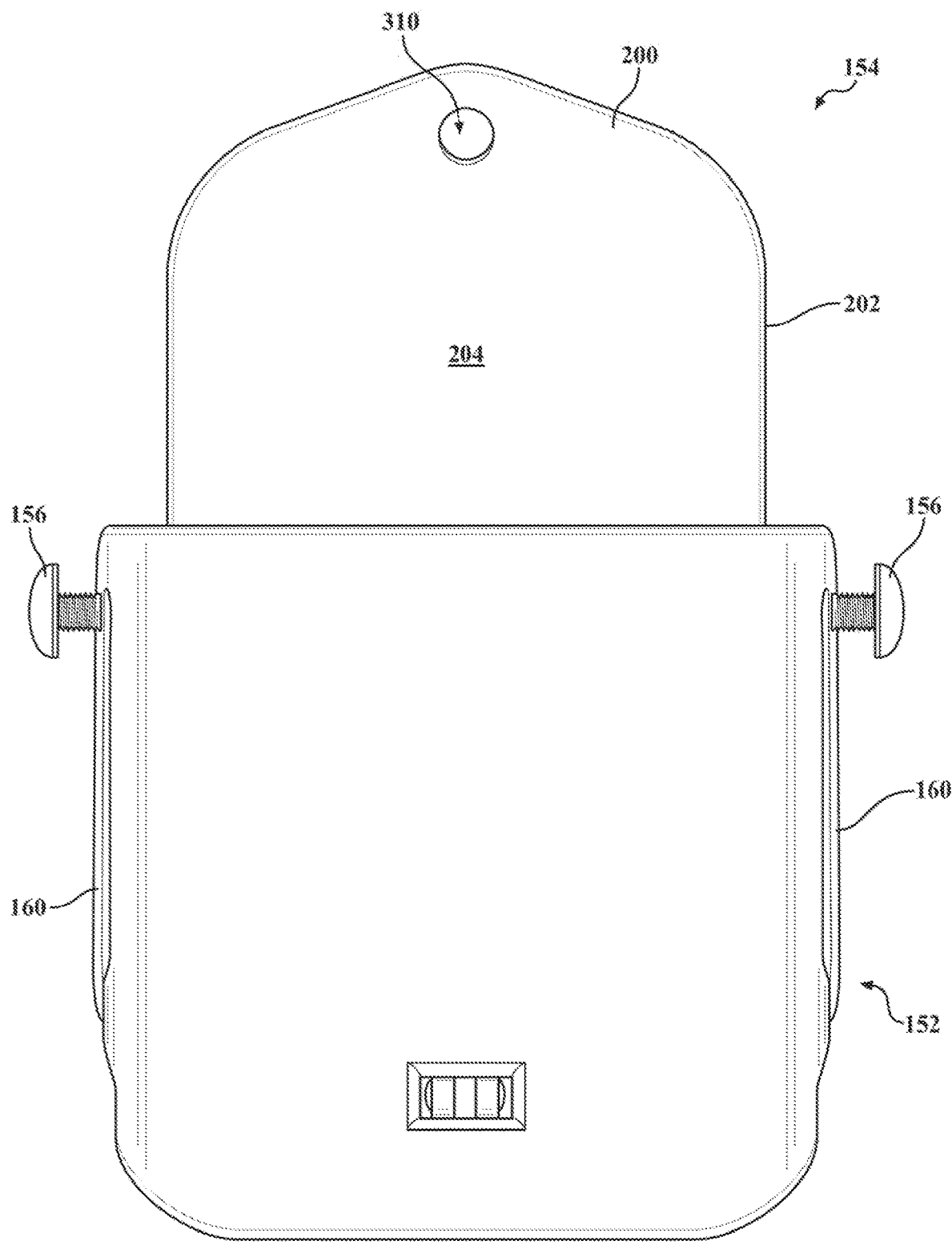
FIG. 9 is a rear view of the support assembly of FIG. 6.
Figure 10:
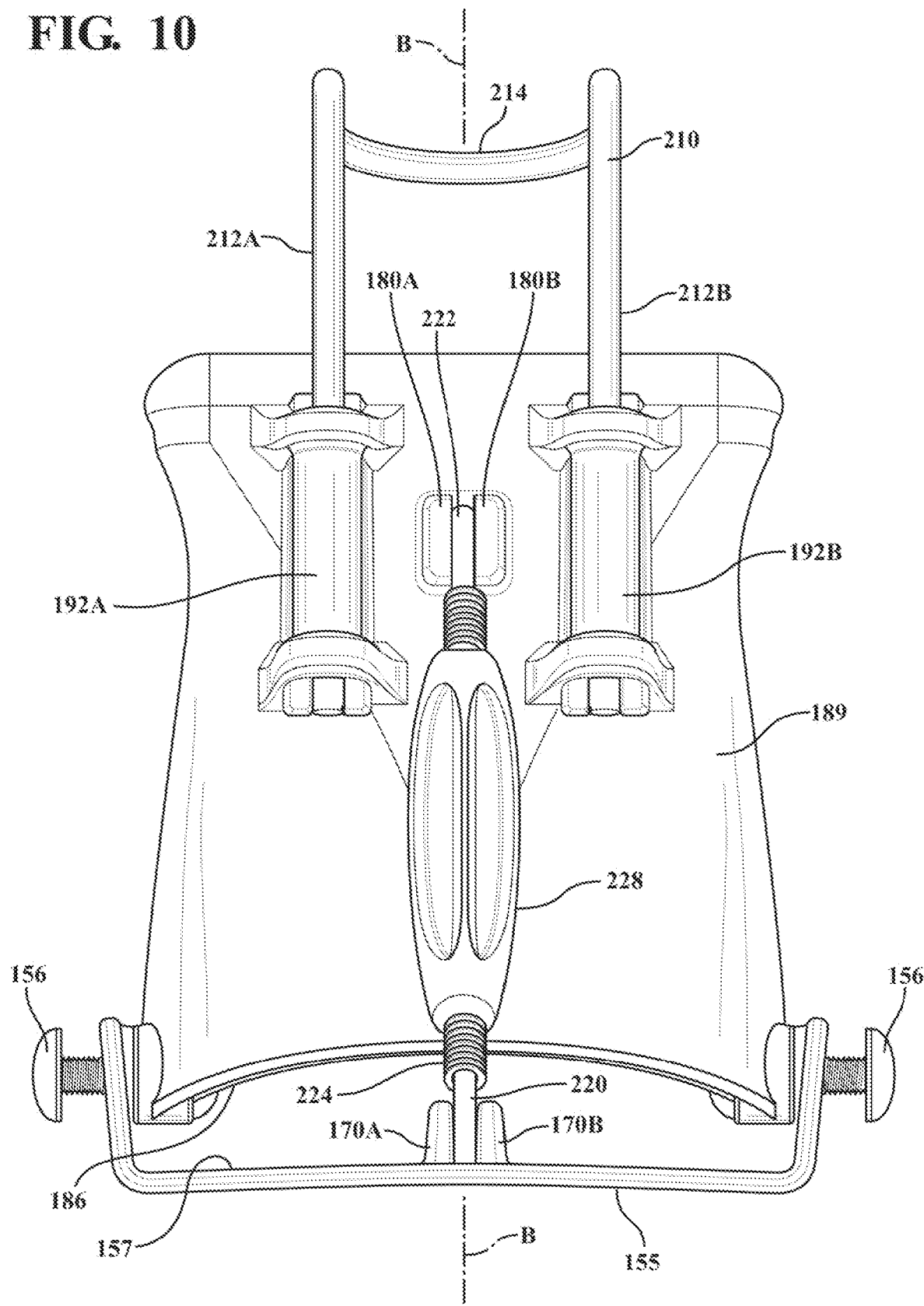
FIG. 10 is a bottom view of the support assembly of FIG. 6.

Referring now to FIGS. 1 and 5-11, the support assembly 150 includes a torso panel 152 pivotally to an arm receiving pocket 154 utilizing a pair of pivot pins or pivot screws (shown FIG. 5-11 as pivot screws 156). The collinear length of the pivot pins 156 define an axis A, also referred to as a pivot axis A. An expander assembly 158 is also pivotally coupled to and between the torso panel 152 and the arm receiving pocket 154. Accordingly, the support assembly 150 the torso panel 152 to be pivoted about the pivot axis A in either a clockwise or counterclockwise direction (the counterclockwise direction as illustrated in FIG. 7 may alternatively be referred to as a first rotational direction $R_1$, while the clockwise direction as illustrated in FIG. 7 may alternatively be referred to as a second rotational direction $R_2$) between a plurality of operating positions as will be explained further below.

The torso panel 152 includes a body portion 153 having an inner surface 155 and an opposing outer surface 157 and a pivot portion 159 extending from the body portion 153. In the exemplary embodiment illustrated in FIGS. 1 and 5-11, the pivot portion 159 includes a pair of spaced apart flanges 160 extending transverse from the outer surface 157 of opposing lateral ends of the body portion 153. In certain embodiments, the body portion 153 is generally flat, and thus may be referred to as a generally flat body portion 153. In alternative embodiments, the body portion 153 may be curved to resemble the curvature of the torso more closely 42 of the operator. Each one of the pair of flanges 160 includes a slot region 164 having a length and width sufficient to receive a portion of the support belt 70, and in particular a portion of the torso belt 72, therethrough (see FIG. 5B), with the flat body portion 153 being between the torso 42 of the operator and the support belt 70 (see FIG. 5B) when the handheld camera support assembly 50 is in use by the operator and wherein the harness 60 is secured to the operator. Each of the pair of flanges 160 also includes a respective opening 165 through which the pivot pins 156 are inserted. The outer surface 157 of the torso panel 152 includes a pair of spaced apart semi-circular ring structures 170A, 170B coupled or otherwise mounted thereto that provide the pivotal connection point for the expander assembly 158 relative to the torso panel 152.

The arm receiving pocket 154 is generally an L-shaped panel so as to comfortably receive the arm of an operator. The arm receiving pocket 154 includes an arm resting portion 180 that is preferably curved and extending transverse to and away from the outer surface 157 of the torso panel 152. A first end 186 of the arm resting portion 180 positioned adjacent to the outer surface 157 of the torso panel 152 includes a pair of spaced apart outer flange portions 182, with the width of the outer surface of the spaced apart flange portions 182 being slightly less that the distance between the inner surface of the respective flanges 160. The spaced apart outer flange portions 182 each include an opening 184 for receipt of the pivot pin or pivot screw 156 to pivotally couple the torso panel 152 to the arm receiving pocket 154 so that the arm receiving pocket 154 can pivot around the torso panel 152 along the pivot axis A. The arm resting portion 180 preferably includes a concavely shaped upper surface 187 between the outer flange portions 182 and an opposing lower surface 189 shaped to maintain a generally equal thickness between the upper and lower surface 187, 189. The lower surface 189 includes a pair of spaced apart semi-circular ring structures 180A, 180B coupled or otherwise mounted thereto that provide the pivotal connection point for the expander assembly 158 to the arm receiving pocket 154. Still further, the lower surface 189 also includes a pair of spaced apart semi-cylinders 192A, 192B coupled or otherwise mounted thereto that provide the sliding connection point for the pronged end portions 212A, 212B of a camera assist mount 210.

The camera assist mount 210 includes a u-shaped transverse section 214 connecting the pronged end portions 212A, 212B that serves as a mounting or support point for a handheld camera 250 being used by the operator. The camera assist mount 210 is slidable relative to the arm receiving pocket 154 between a stored position (see FIGS. 1A, 5-10 and 12) and a mount assist position (see FIG. 1B). In the stored position, the pronged end portions 212A, 212B are slid further within the pair of spaced apart semi-cylinders 192A, 192B generally towards the torso panel 152 (shown by arrow $S_1$ in FIG. 7), while in the mount assist position the pronged end portions 212A, 212B are slid in the opposite direction (shown by arrow $S_2$ in FIG. 7) within the pair of spaced apart semi-cylinders 192A, 192B in a direction away from the torso panel 152.

The arm receiving pocket 154 also includes an arm guide portion 200 that extends transverse to curved arm resting portion 180. The arm guide portion 200 is a panel portion having an outward side surface 202 and an opposing inward side surface 204. In the stored position, the u-shaped transverse section 214 is brought into closest proximity to the outward side surface 202 of the arm guide portion 200, while in the mount assist position the u-shaped transverse section 214 is moved outwardly away from the outward side surface 202 of the arm guide portion 200, thereby increasing the distance between the u-shaped transverse section 214 and the outward side surface 202 of the arm guide portion 200 to allow the handheld camera 250 to be hung onto the u-shaped transverse section 214 with the opening 254 within the handle 252 of the hand held camera 250 positioned around the u-shaped transverse section 214 (see FIG. 1B), and thereby be supported by the u-shaped transverse section 214, to store the handheld camera 250 or to allow the operator to operate the camera 250 for low-angle filming.

The expander assembly 158 includes a first ball shaped end 220 that is pivotally secured between and pivotal relative to the spaced apart semi-circular ring structures 170A, 170B and an opposing second ball shaped end 222 secured between and pivotal relative to the spaced apart semi-circular ring structures 180A, 180B. A first threaded tubular portion 224 extends from the first ball shaped end 220, while a second threaded tubular portion 226 extends from the second ball shaped end 222.

A handle 228 having a threaded interior portion is threadingly coupled to the threads of each of the respective threaded tubular portions 224, 226 opposite their respective ends 220, 222 and is capable of rotating in a first rotational direction or second rotational direction opposite the first rotational direction around an axis B defined by the colinear lengths of the threaded tubular portions 224, 226. As illustrated, the axis B is different than pivot axis A, and in the embodiments described herein the pivot axis A runs transverse to axis B. The rotation of the handle 228 in a first rotational direction about axis B causes first threaded tubular portion 224 to move in a direction away from the second threaded tubular portion 226, thereby increasing the distance between the respective ends 220, 222, while the rotation of the handle 228 in the second rotational direction about axis B opposite the first rotational direction causes first tubular portion 224 to move in a direction towards the second tubular portion 226, thereby decreasing the distance between the respective ends 220, 222.

To accommodate increase or decrease in distance between the respective ends 220, 222 resulting from the rotation of the handle 228, the arm receiving pocket 154 pivots around the pivot axis A relative to the torso panel 152. In particular, the rotation of the handle 228 in the first rotational direction about the axis B, which results in the increase of distance between respective ends 220, 222 of the threaded tubular portions 224, 226, is accompanied by a pivoting of the arm receiving pocket 154 relative to axis A relative to the torso panel 152 in the first rotational direction $R_1$ (see FIG. 7), which results in the arm receiving pocket 154 being moved relative to the torso panel 152 from a first operating position to a second operating position. Conversely, the rotation of the handle 228 in the second rotational direction about axis B, opposite the first rotational direction which results in the decrease in the distance between the respective ends 220, 222 of the threaded tubular portions 224, 226, is accompanied by a pivoting of the arm receiving pocket 154 relative to axis A relative to the torso panel 152 in rotational direction $R_2$ (see FIG. 7) opposite the rotational direction $R_1$, which results in the arm receiving pocket 154 being moved relative to the torso panel 152 from the first operating position to a third operating position. Accordingly, the rotation of the handle 228 in either the first or second rotational direction about the axis B is accompanied by a pivoting of the arm receiving pocket 154 relative to axis A relative to the torso panel 152 between a plurality of operating positions, which allows the operator therefore to adjust the assembly 50 to a desired one of the plurality of operating positions that is comfortable for the operator and provides the desired support of the arm of the operator for filming.

To utilize the assembly 50 as intended, it is first necessary to couple the support assembly 150 to the support belt 70. This is accomplished by threading the support belt 70/torso belt 72 through each of the slot regions 164 (see FIG. 5B) such that the foamed fabric support pad 96, such that the inner portion of the length l of support belt 70/torso belt 72 is adjacent to the outer surface 157 of the torso panel 152. If included, the coupling is also such that the foamed fabric support pad 96 is adjacent to the inner surface 155 of the torso panel 157.

Next, the support belt 70/torso belt 72 is positioned around the torso 42 of the operator such that the foamed fabric support pad 96 (when utilized) is positioned between the torso 42 and the torso panel 157. If the foamed fabric support pad 96 is not present, then the torso belt 72 is positioned such that the torso 42 is adjacent to the torso panel 157.

Next, the male prong portion 82 is inserted within the female frame portion 80, and the length of the support belt 70 is shortened by pulling the support belt 70 through each of the webbing slide locks 84 to tighten the support belt 70 against the torso 42. In addition, the pair of shoulder pad portions 104 of the upper harness portion 100 are each respectively looped over the right and left shoulders 45, 47 of the shoulder region 44 and the front mounting looped straps 124 are looped through the respective rigid ring 87A of the fixed rigid rings 86. The male prong portion 130 is inserted within the respective female frame portion 128 of the respective front mounting looped strap 124, and the first loose portion 114 of the respective pair of adjustable straps 110 are tightened. Finally, the male prong portion 144 of the first sternum strap 140 is inserted within the female frame portion 146 of the second sternum strap 141 to complete the coupling process.

Once coupled, the operator may pick up the handheld camera 250 and position the camera in a manner such that the operator's arm, and in particular the operator's elbow, is placed onto the arm receiving pocket 154 with the bend in the elbow located at the intersection between the concavely shaped upper surface 187 of the curved arm resting portion 180 and the forearm-side surface 204 of the arm guide portion 200. A portion of the handheld camera 250 may be secured or otherwise positioned onto the prong shaped tubular sections 212A, 221B of the camera assist mount 210 between the u-shaped transverse section 214 and the outward side surface 202.

To adjust the comfort and support level of the operator holding the handheld camera 250 on the shoulder as in FIG. 1A (with the camera assist mount 210 in the stored position) or storing or utilizing the camera 250 while supported on the u-shaped transverse section 214 as in FIG. 1B with the camera assist mount 210 in the mount assist position, the present invention allows adjustment of the relative angle of the arm receiving pocket 154 relative to the torso panel 152 by pivoting arm receiving pocket 154 relative to the torso panel 152 about axis A between the plurality of operating positions by rotating the handle 228 of the adjust mechanism in the first rotational direction or second rotational direction about the axis B, thereby increasing or decreasing the distance between the respective ends 220, 222 of the threaded tubular portions 224, 226 as noted above.

Still further, the distance between the u-shaped transverse section 214 and the outward side surface 202 can be decreased or increased by applying force to the pronged end portions 212A, 212B, typically via pulling or pushing of the pronged end portions 212A, 212B in a direction towards (see arrow S1 in FIG. 7) or away (see arrow S2 in FIG. 7) from the torso panel 152, such that pronged end portions 212A, 212B are moved further into, or further out of, their respective spaced apart semi-cylinders 192A, 192B via an axial movement defined along the length of the semi-cylinders 192A, 192B between the stored position (see FIG. 1A), when supporting the handheld camera 250 is not required, and the mount assist position (see FIG. 1B) where supporting the handheld camera 250 while storing the camera 250 or while filming low level shots is desired.

In certain further embodiments, as best shown in FIGS. 1-4, an additional adjustable strap assembly 300 is coupled between the upper harness portion 100 and the support assembly 150 that aids in supporting the support assembly 150 when the handheld camera support assembly 50 is being worn by the operator. More in particular, when the operator is operating a camera 250 and has placed their arm within the support assembly 150 and has placed the handheld camera 250 onto the u-shaped transverse section 214 for storage or for low angle filming as in FIG. 1B, the additional adjustable strap 300 functions to maintain the position of the support assembly 150 relative to the torso 42 of the operator 40 such that the arm receiving pocket 204 is generally maintained in a horizontal relationship to the ground and generally parallel with a horizontal plane running through the shoulders 45, 47 of the operator 40.

The adjustable strap assembly 300 includes a strap 301, a carabiner 302, 304 coupled at each respective end 313, 311 of the strap 301, and a ladder lock 306 coupled to the strap 301 between the caribiners 302, 304 to adjust the length of the strap 301. The upper carabiner 302 connects to a D ring attached to either shoulder pad portions 104 which runs down to link within an opening 310 defined within the arm guide portion 200 of the arm receiving pocket 154 (opening 310 is shown best in FIGS. 5A and 5B).

Figure 11:
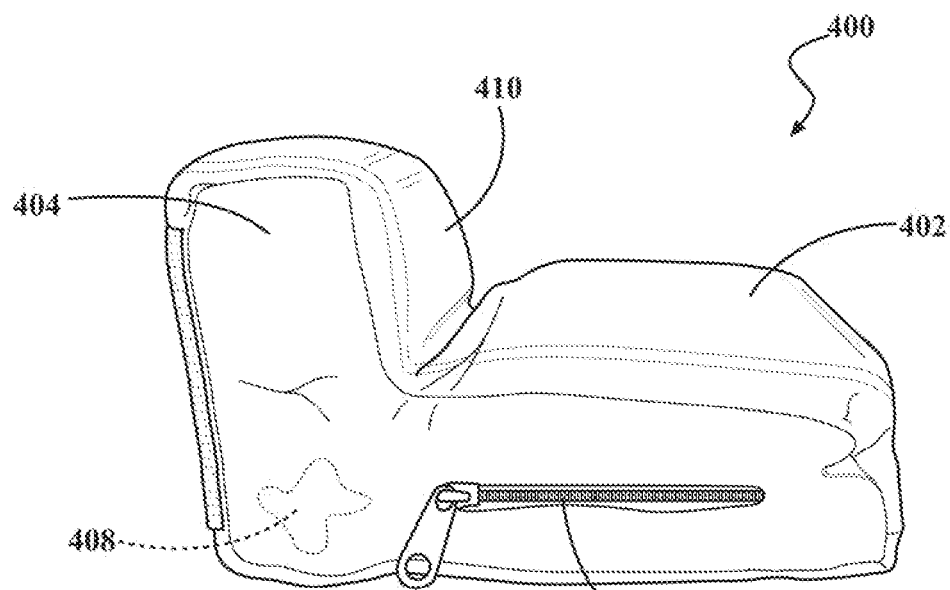
FIG. 11 is front perspective view of an arm support pad for use in the handheld camara support assembly.
Figure 12:
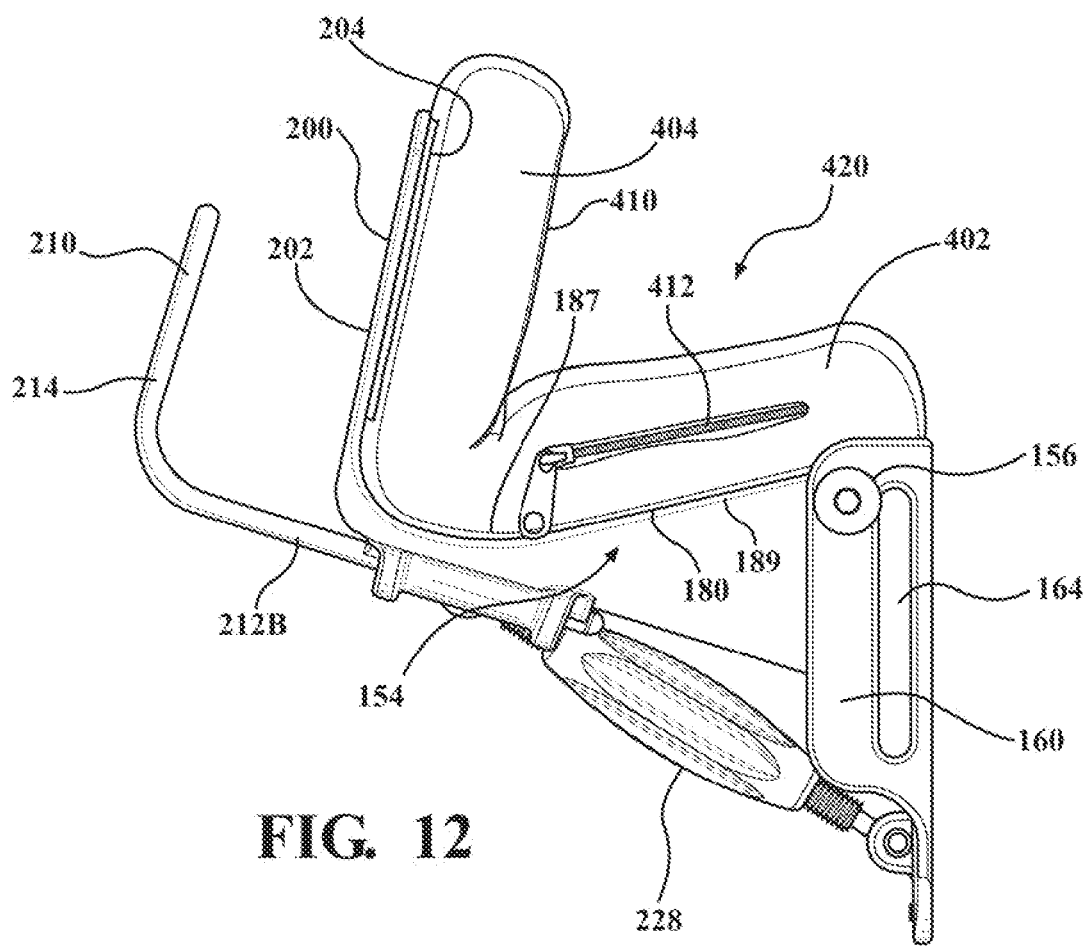
FIG. 12 is a side view of the support assembly of FIG. 6 including the arm support pad of FIG. 11 positioned on the arm receiving pocket and with the camera mount assist in the mount assist position.

Referring now to FIGS. 11 and 12, in a still further embodiment of the present invention, an arm support pad 400 is included which is positioned onto, and in certain cases is reversibly mounted to, the arm receiving pocket 154. The arm support pad 400 provides a cushion layer between the operator's arm/elbow and the arm receiving pocket 154 when the operator 40 is utilizing the handheld camera support assembly 50.

The arm support pad 400 is generally L-shaped with a first leg 402 positioned onto the arm resting portion 180 of the arm receiving pocket 154 and with a second leg 404 positioned adjacent to the inward side surface 204 of the arm guide portion 200. According, the second leg 404 extends transverse from the first leg 402. In certain embodiment, the second leg 404 may be reversibly mounted to the inward side surface 204, such as through the use of a hook and loop fastener system.

In certain embodiments, the arm support pad 400 includes an inner cushioning material 408 that is introduced within a durable and flexible cover 410. In certain embodiments, the inner cushioning material 408 is in the form of an elastomeric material such as a polymer foam. Still further, in certain embodiments, the cover includes a zipper 412 or other reversible fastener that allows access to remove and replace the inner cushioning material 408 as desired.

In certain embodiments, the first leg 402 is curved so as to form a pocket 420 that comfortably receives the operator's arm or elbow when coupled to the arm receiving pocket 154. Alternatively, and due to the malleability of the arm support pad 400, the curvature that is formed to define the pocket 420 may be the result of the first leg 402 of the arm support pad 400 conforming in shape to the curved arm rest portion 180.

The handheld camera support assembly 50 in accordance with any of the embodiments of the present invention thus provides a solution for reducing fatigue during long shoots due to the weight of the handheld camera 250. In particular, the handheld camera support assembly 50 provide support for an operator's arm when holding the handheld camera 250 on the shoulder during certain types of filming (see FIG. 1A) and also provides support for the operator's arm when holding the handheld camera 250 in a low angle position in other types of filming (see FIG. 1B). The handheld camera support assembly 50 also allows the handheld camera 250 to be supported in a stored position when not filming (also shown in FIG. 1B), thereby reducing the necessity to separately store and set down/pick up the camera 250 between shoots.

In conjunction therewith, the handheld camera support assembly 50 in accordance with any of the embodiments of the present invention also provides additional functionality features within the support assembly 150 that allows the operator to perform other tasks easily, such as get a drink of water or communicate with another person over long distances with a radio or the like without being required to set down the camera 250 and pick up the camera 250 and correspondingly delay filming.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular. It will be further appreciated that the terms "include," "includes," and "including" have the same meaning as the terms "comprise," "comprises," and "comprising."

What is claimed is:

1. A handheld camera support assembly for use by an operator, said handheld camera support assembly comprising:
    a harness for being secured around a torso and shoulders of the operator, wherein said harness includes a support belt defining a plane extending through the support belt with the support belt configured to be secured around the torso; and
    a support assembly mounted to said harness, said support assembly comprising:
        a torso panel including a body portion coupled to said support belt,
        an arm receiving pocket configured to receive an arm of the operator with said arm receiving pocket having an arm resting portion and an arm guide portion,
        wherein said arm resting portion has an inner end and an outer end with said inner end pivotally coupled to said torso panel, and
        wherein said arm guide portion is mounted to said outer end of said arm resting portion with said arm guide portion extending transverse to said arm resting portion to form a pocket with an axis defined by said arm guide portion intersecting said plane of said support belt, and
    an adjust mechanism coupled to said torso panel and said arm receiving pocket to pivot said arm receiving pocket relative to said torso panel between a plurality of operating positions.

2. The handheld camera support assembly according to claim 1, wherein said adjust mechanism comprises an expander assembly pivotally coupled at a first end to said torso panel and pivotally coupled at a second end to said arm receiving pocket with said expander assembly including a handle, wherein rotation of said handle causes a distance between said first and second end to change, and wherein the change in distance between said first and second end causes said arm receiving pocket to pivot relative to said torso panel.

3. The handheld camera support assembly according to claim 1 further comprising an arm support pad positioned onto said arm receiving pocket.

4. The handheld camera support assembly according to claim 3, wherein said arm support pad includes a first leg positioned onto said arm resting portion a second leg positioned adjacent to an inward side surface of said arm guide portion, said second leg extending transverse from said first leg and with said first leg curved so as to form a pocket.

5. The handheld camera support assembly according to claim 1 further comprising a camera assist mount coupled to said arm receiving pocket with said camera assist mount configured to support a camera of the operator, wherein said camera assist mount is slidable relative to said arm receiving pocket between a stored position and a mount assist position.

6. The handheld camera support assembly according to claim 5, wherein said camera assist mount comprises a u-shaped transverse section connected between a pair of pronged end portions, with each of said pair of pronged end portions are slidingly connected to said support assembly.

7. The handheld camera support assembly according to claim 1, wherein said torso panel further comprises:
    a pivot portion comprising a pair of spaced apart flanges each extending transverse from said opposing ends of said body portion, with each of said spaced apart flanges including a respective one slot region that receives said support belt of said harness therethrough.

8. The handheld camera support assembly according to claim 7 further comprising a pair of pivot pins, wherein a first one of said pair of pivot pins pivotally couples said arm receiving pocket to a first one of said pair of flanges and wherein a second one of said pair of pivot pins pivotally couples said arm receiving pocket to a second one of said pair of flanges.

9. The handheld camera support assembly according to claim 8, wherein said arm resting portion includes a pair of spaced apart outer flange portions positioned between said respective pair of said spaced apart flanges of said torso panel,
    with a respective first one of said pair of spaced apart outer flange portions pivotally coupled to a corresponding adjacent first one of said pair of flanges of said torso panel and with a second respective one of said pair of spaced apart outer flange portions pivotally coupled to a corresponding adjacent second one of said pair of flanges of said torso panel.

10. The handheld camera support assembly according to claim 9 further comprising a pair of pivot pins,
    wherein a first one of said pair of pivot pins pivotally couples said respective first one of said pair of spaced apart outer flange portions to said corresponding adjacent first one of said pair of flanges, and
    wherein a second one of said pair of pivot pins pivotally couples said corresponding adjacent second one of said pair of spaced apart outer flange portions to said corresponding adjacent second one of said pair of flanges.

11. The handheld camera support assembly according to claim 1, wherein said harness further comprises:

an upper harness portion coupled to said support belt and having a length configured to extend over the right and left shoulders of the operator.

12. The handheld camera support assembly according to claim 11, further comprising an adjustable strap assembly coupled between said upper harness portion and said arm receiving pocket.

13. The handheld camera support assembly according to claim 1, further comprising an adjustable strap assembly coupled at one end to said harness and at another end to said arm receiving pocket.

14. A handheld camera support assembly for use by an operator, said handheld camera support assembly comprising:
  a harness for being secured around a torso and shoulders of the operator, wherein said harness includes a support belt and an upper harness portion; and
  a support assembly mounted to said harness, said support assembly comprising:
    a torso panel, and
    an arm receiving pocket having an arm resting portion pivotally coupled to said torso panel and an arm guide portion extending transverse from said arm receiving portion with said arm receiving pocket configured to receive an arm of the operator;
  an adjust mechanism coupled to said torso panel and said arm receiving pocket to pivot said arm receiving pocket relative to said torso panel between a plurality of operating positions; and
  an adjustable strap assembly coupled at one end to said upper harness portion of said harness and at another end to said arm guide portion of said arm receiving pocket.

15. The handheld camera support assembly according to claim 14, wherein said adjustment mechanism comprises an expander assembly pivotally coupled at a first end to said torso panel and pivotally coupled at a second end to said arm receiving pocket with said expander assembly including a handle, wherein rotation of said handle causes a distance between said first and second end to change, and wherein the change in distance between said first and second end causes said arm receiving pocket to pivot relative to said torso panel.

16. The handheld camera support assembly according to claim 14, wherein said arm receiving pocket includes an arm resting portion extending transverse to and away from said torso panel and an arm guide portion extending transverse to said arm resting portion.

17. The handheld camera support assembly according to claim 14 further comprising a camera assist mount coupled to said arm receiving pocket with said camera assist mount configured to support a camera of the operator, wherein said camera assist mount is slidable relative to said arm receiving pocket between a stored position and a mount assist position.

18. The handheld camera support assembly according to claim 14, wherein said harness includes a support belt, and wherein said torso panel comprises:
  a body portion having an inner surface and an outer surface;
  a pivot portion comprising a pair of spaced apart flanges each extending transverse from said opposing ends of said body portion, with each of said spaced apart flanges including a slot region that receives said support belt of said harness therethrough, with said body portion being disposed between the torso of the operator and said support belt.

19. The handheld camera support assembly according to claim 18 further comprising a pair of pivot pins, wherein a first one of said pair of pivot pins pivotally couples said arm receiving pocket to a first one of said pair of flanges and wherein a second one of said pair of pivot pins pivotally couples said arm receiving pocket to a second one of said pair of flanges.

20. The handheld camera support assembly according to claim 14, wherein said harness comprises:
  a support belt configured to be secured around the torso of the operator with a portion of said support belt coupled to said torso panel with said torso panel being between the torso of the operator and said portion of said support belt; and
  an upper harness portion coupled to said support belt and having a length configured to extend over the right and left shoulders of the operator.

* * * * *